United States Patent [19]
Miller

[11] 3,738,155
[45] June 12, 1973

[54] DENSITOMETER PROBE SUPPORT

[75] Inventor: Charles Eveleigh Miller, Boulder, Colo.

[73] Assignee: International Telephone and Telegraph Corporation, New York, N.Y.

[22] Filed: Mar. 11, 1971

[21] Appl. No.: 123,350

[52] U.S. Cl. ............................................ 73/32
[51] Int. Cl. ............................................ G01n 9/00
[58] Field of Search ................ 73/23, 26, 25, 20, 73/27, 32, 86, 194 B, 349, 432 R, 432 A; 137/317, 318

[56] References Cited
UNITED STATES PATENTS

| | | | |
|---|---|---|---|
| 2,780,094 | 2/1957 | Fink | 73/53 |
| 3,007,340 | 11/1961 | Kraftson | 73/86 X |
| 3,426,593 | 2/1969 | Jacobs | 73/32 |
| 3,585,843 | 6/1971 | Stansfeld | 73/32 |
| 3,627,493 | 12/1971 | Manley | 73/86 |

*Primary Examiner*—Richard C. Queisser
*Assistant Examiner*—Arthur E. Korkosz
*Attorney*—C. Cornell Remsen, Jr., Walter J. Baum, Paul W. Hemminger, Charles L. Johnson, Jr. and Thomas E. Kristofferson

[57] ABSTRACT

A flexible support for a retractable vibration densitometer probe including a rigid tube telescoped into the rigid housing of the probe in spaced relation thereto and a metal bellows sealed to the tube and probe in spaced relation thereto. The space between the bellows and the tube, and the space between the tube and housing are filled with a single piece of rubber bonded to all of the surfaces surrounding it.

13 Claims, 9 Drawing Figures

PATENTED JUN 12 1973
3,738,155
SHEET 1 OF 3
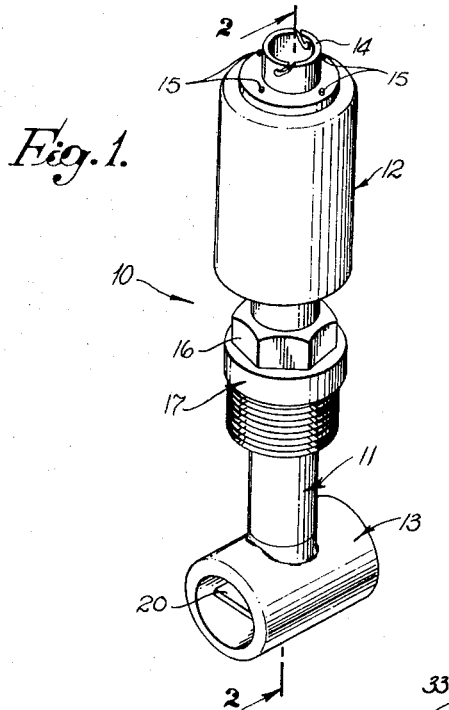
Fig. 1.
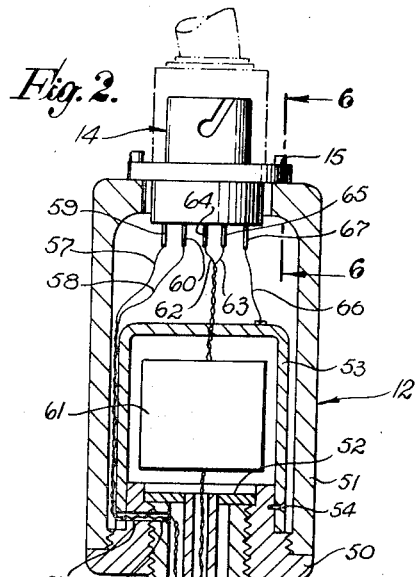
Fig. 2.
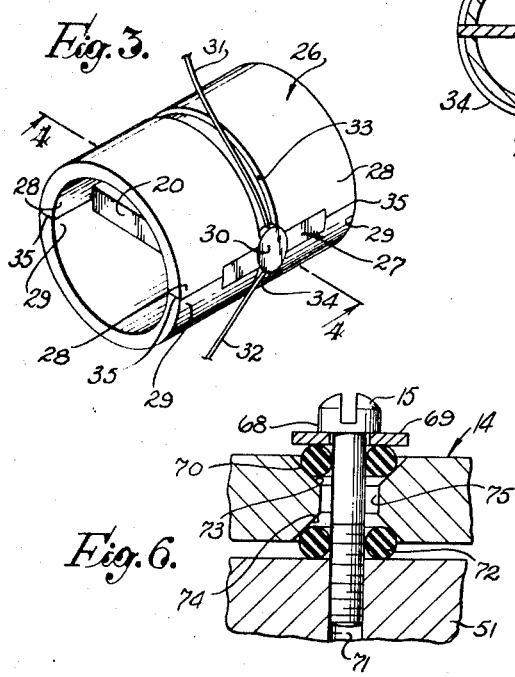
Fig. 3.
Fig. 4.
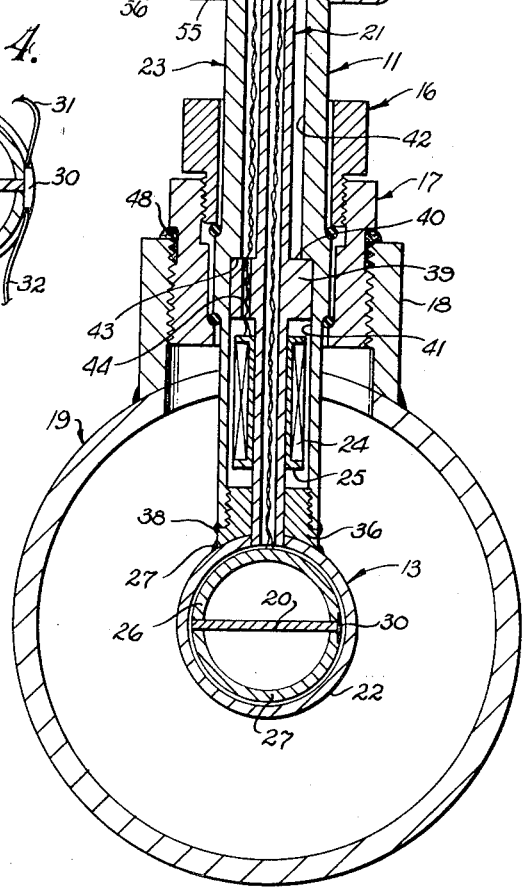
Fig. 6.
Fig. 5.
INVENTOR.
CHARLES E. MILLER
BY
ATTORNEY

INVENTOR.
CHARLES E. MILLER
BY
ATTORNEY 3,738,155

DENSITOMETER PROBE SUPPORT

BACKGROUND OF THE INVENTION

This invention relates to devices for producing an electrical output signal which is a function of fluid density, and more particularly, to vibration densitometers or the like.

In the past it has been difficult to calibrate or to repair densitometers while they are hooked up with a pipeline.

SUMMARY OF THE INVENTION

In accordance with the device of the present invention, the above-described and other disadvantages of the prior art are overcome by providing a retractable probe vibration densitometer. When used with a gate valve or the like, the probe may be retracted, shut off from the pipeline and repaired and/or calibrated without shutting down the line.

It is an outstanding feature of the invention that a flexible coupling is employed between the probe and its support. This coupling has unexpectedly increased the accuracy of the instrument to a considerable degree. The probe is apparently sensitive to the "effective" length of the retractable support. The effective length changes with probe position because the effective length is measured from the probe to the support mount. This distance changes as the support and probe are lowered into and retracted from the pipeline.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a perspective view of a vibration densitometer probe;

FIG. 2 is a sectional view of the probe taken on the line 2—2 shown in FIG. 1;

FIG. 3 is a perspective view of a group of component parts of the probe shown in FIG. 1;

FIG. 4 is a transverse sectional view of the assembly taken on the line 4—4 shown in FIG. 3;

FIG. 5 is an enlarged longitudinal sectional view of a portion of the probe shown in FIG. 1;

FIG. 6 is a longitudinal sectional view of a portion of mounting means for an electrical connector otherwise substantially fixed relative to the probe taken on the line 6—6 shown in FIG. 2;

DESCRIPTION OF THE PREFERRED EMBODIMENTS

Figure 7:
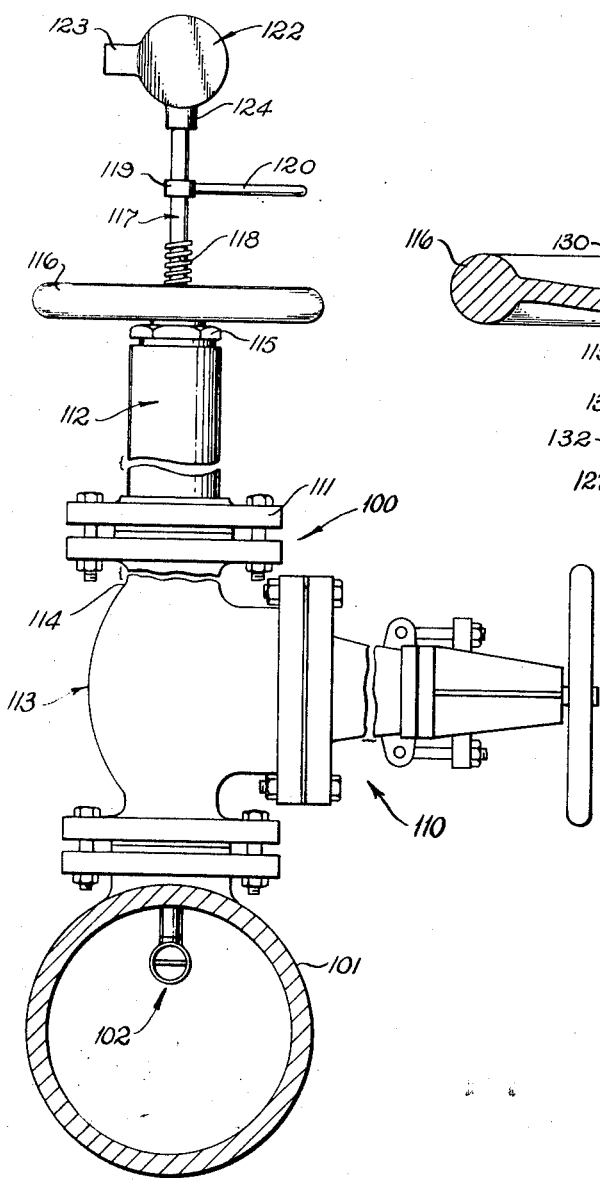
FIG. 7 is a side elevational view of a retractable probe assembly constructed in accordance with the present invention.

FIGS. 1 to 7, inclusive, are identical to those shown in copending application Ser. No. 65,371, now U.S. Pat. No. 3,677,067, filed Aug. 20, 1970, by C. E. Miller and G. L. Schlatter for DENSITOMETER.

In FIG. 1, a vibration densitometer probe is indicated at 10 having a shank 11, a housing 12 at its upper end, a tubular assembly 13 at its lower end, and an electrical connector assembly 14 at the upper end of housing 12 fixed thereto by bolts 15. Annular fittings 16 and 17 extend around shank 11 for mounting probe 10 in a hollow cylindrical extension 18 of a pipeline 19, as shown in FIG. 2.

As shown in FIGS. 1 and 2, a stainless steel vane 20 is mounted in assembly 13 in a position perpendicular to the axis of a hollow cylindrical magnetostrictive inner tube 21. Vane 20, if desired, may be also mounted in a symmetrical position with respect to the axis of an outer sleeve 22 which houses it.

Vane 20 may be a rectangular plate having flat and parallel upper and lower surfaces as shown in FIG. 2, and may otherwise have mutually normal surfaces forming a right parallelopiped.

Shank 11 not only includes inner tube 21, but an outer magnetic tube 23. A driver coil or solenoid winding 24 wound on a nylon bobbin 25 is press fit onto the external surface of inner tube 21 and located in a space between the tubes 21 and 23 toward the lower end of shank 11. Coil 24 is thus maintained in a substantially fixed position on inner tube 21, although the same is not necessarily critical to the operation of the device of the present invention.

Vane 20 is supported between two half cylinders 26 and 27 as shown in FIGS. 2 and 3. The longitudinal edges of vane 20 are pressed together between half cylinders 26 and 27 with a pressure of, for example, 20,000 pounds per square inch because the assembly shown in FIG. 3 is inserted in sleeve 22 with an interference fit, sleeve 22 being heated prior to the said insertion.

Half cylinder 26 has four projections 28, and half cylinder 27 has four projections 29. Projections 28 and 29 serve to prevent longitudinal movement of vane 20 between half cylinder 26 and half cylinder 27 although the same is not likely due to the clamping pressure on vane 20 between half cylinder 26 and half cylinder 27.

Half cylinders 26 and 27, and vane 20 may be machined to have a flat or recess to receive a piezoelectric crystal 30. Crystal 30 has electrical leads 31 and 32 which extend around half cylinders 26 and 27 in grooves 33 and 34, respectively, to a point where they enter the hollow interior of inner tube 21. This entry is made at the lower end of inner tube 21, as shown in FIG. 2.

As shown in FIG. 3, projections 28 and 29 may have a slight separation at 35 to insure that the pressure contact of half cylinders 26 and 27 on vane 20 is quite high due to the said interference fit.

As shown in FIG. 2, a boss 36 is welded at 37 to sleeve 13 in a fluid tight manner. Although the device of the present invention need not always be fluid tight throughout, a glass-to-metal seal or other seal may be provided inside inner tube 21 for leads 31 and 32. Before the said interference fit is provided, if desired, crystals 30, and those portions of leads 31 and 32 in grooves 33 and 34, respectively, may be potted with an epoxy. Further, after the interference fit has been effected, the entire unit when completely assembled may be treated further by applying a bonding agent around all of the structures inside sleeve 22. Any conventional bonding process may be employed including, but not limited to, the application of a bonding agent sold under the name of "Locktile."

As stated previously, boss 36 may be welded to sleeve 22 at 37 in a fluid tight manner. Further, outer tube 23 may be threaded onto boss 36 and welded thereto at 38 in a fluid tight manner. For all practical purposes, boss 36 may thus be considered an integral part of outer tube 23. Boss 36, for example, is also made of a magnetic material. All of the "magnetic materials" referred to herein may be any magnetic material including, but not limited to, stainless steel. However, inner tube 21, although being magnetic, must also be magnetostrictive. Notwithstanding this limitation, it is to be noted that inner tube 21 is employed to produce vibration, and if one feature of the present invention is used without another, the use of a magnetostrictive or magnetic material may not be required, and the invention still practiced.

Inner tube 21 has an annular projection 39 with a shoulder 40. Outer tube 23 has a lower bore 41 separated from a smaller upper counter bore 42 by an annular shoulder 43. Shoulder 40 and 43 abut. From shoulder 40 to the lower end of inner tube 21, inner tube 21 is always in axial compression. That is, inner tube 21 is in compression when coil 24 is energized, but inner tube 21 is also in compression when coil 24 is deenergized. Coil 24 is energized with an alternating current which thus merely changes the degree of compression of inner tube 21.

Projection 39 has a hole 44 through which the electrical leads of coil 24 can pass from the location of coil 24 upwardly between tubes 21 and 23.

The manner in which probe 10 is mounted in pipeline 19 is better illustrated in FIG. 5. In FIG. 5, note will be taken that outer tube 23 has an outwardly extending radial projection 45 on each side of which rubber O-rings 46 and 47 are compressed by fittings 16 and 17. Fitting 17 is threaded into extension 18 and sealed thereto by a conventional sealing compound 48 shown in FIG. 2. In FIG. 5, note will be taken that fitting 16 is threaded inside fitting 17 at 49. The amount O-rings 46 and 47 are compressed is, therefore, determined by the position of fitting 16. That is, fitting 16 is turned, for example, by a wrench, until the desired O-ring compression is reached.

From the construction illustrated in FIG. 5, note will be taken that only O-rings 46 and 47 contact outer tube 23, and that, therefore, shank 11 is never touched by either fitting 16 or fitting 17.

The leads from coil 24 are kept magnetically separate from the leads from crystal 30. This is true through a portion of housing 12 as will be described. Housing 12 has a fitting 50 threaded onto outer tube 23. A cylinder 51 is threaded to fitting 50. A washer 52 is press fit and thereby fixed in fitting 50 and inner tube 21. Inner tube 21 has an upper end which may be fixed relative to or slidable in washer 52, as desired. However, preferably the external surface of inner tube 21 at its upper end fits contiguous or in contact with the surface of washer 52 defining the hole therethrough. A shield 53 made of a magnetic material may be fixed around fitting 50 by one or two or more screws 54. Outer tube 23 has a radial hole 55 therethrough through which the leads from coil 24 pass. Fitting 50 has a hole 56 therethrough in alignment with hole 55 through which the leads from coil 24 pass. From the outward radial extremity of hole 56, the coil leads indicated at 57 and 58 pass upwardly between cylinders 51 and shield 53 and are connected to pins 59 and 60 of the electrical connector 41. Electrical connector 14 may be a conventional five pin connector.

As stated previously, the leads 31 and 32 from crystal 30 extend upwardly through the interior of inner tube 21. At the upper end of inner tube 21, as shown in FIG. 2, leads 31 and 32 are connected to the input of differential amplifier 61. Leads 31 and 32 thus extend outwardly through the upper opening in inner tube 21.

Differential amplifier 61 may be entirely conventional, and mounted on a conventional card, if desired. Amplifier 61 may be supported inside shield 53 by any conventional means, if desired, or simply supported by the strength of leads 31 and 32, and output leads 62 and 63 which are connected to pins 64 and 65 of connector 14, respectively. A lead 66 provides a ground connection from shield 53 to the fifth pin 67 of connector 14.

The manner in which connector 14 is mounted on cylinder 51 is shown in FIG. 6. Only one bolt 15 is shown in FIG. 6 since all bolts 15 are similarly situated. In FIG. 6, bolt 15 is shown having a head 68, a washer 69 under head 68, an O-ring 70 under washer 69, and a shank 71 threaded into cylinder 51. A second O-ring 72 also extends around screw shank 71. O-ring 70 fits between the lower surface of washer 69 and a counter sunk frusto-conical hole 73 in connector 14. O-ring 72 fits between the upper surface of cylinder 51 and another counter sunk frusto-conical hole 74 in connector 14. Holes 73 and 74 are connected by a bore 75. From FIG. 6, it will be noted that all the structures shown therein may vibrate, but that the amount of vibration transmitted to connector 14 may be quite small.

In FIG. 7, a retractable densitometer probe assembly is indicated at 100. A pipeline is indicated at 101. Assembly 100 is employed to insert a vibration densitometer probe 102 into and retract it from pipeline 101.

In FIG. 2, leads 57, 58, 62, 63 and 66 may be connected to the electronic circuit disclosed in said copending application. Thus, the electronics employed with the embodiment of FIG. 2 may be identical to that shown in said copending application. The same is true of the embodiment shown in FIGS. 7, 8 and 9.

Figure 9:
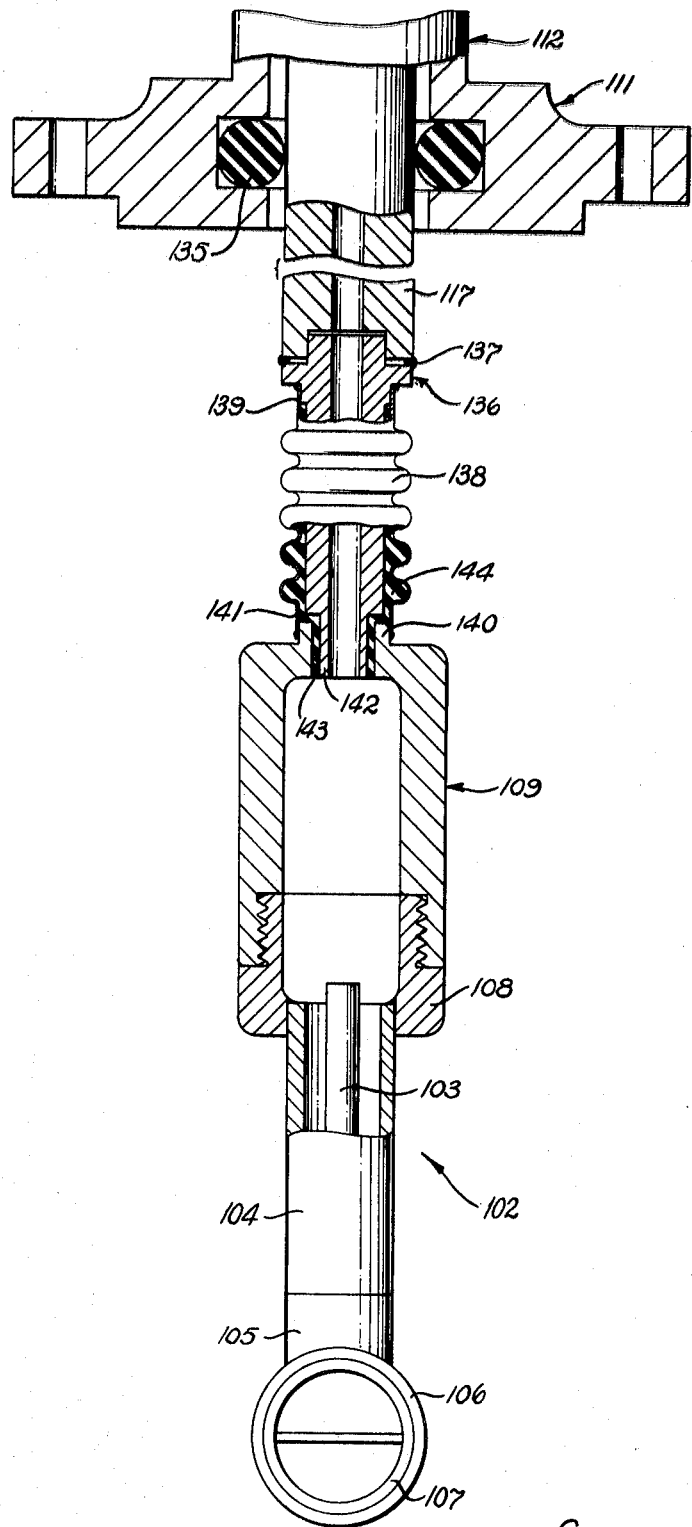
FIG. 9 is a vertical sectional view, partly in elevation, of the probe assembly shown in FIG. 8.

Probe 102 is again shown in FIG. 9, and may have structures 103, 104, 105, 106 and 107 identical to structures 21, 23, 36, 26, 27 and 22 shown in FIG. 2.

As before, structures 103 and 104 are hollow tubes. Tube 104 is fixed and sealed within a ring 108 that is threaded to a cylinder 109. Ring 108 and cylinder 109 form a housing for all the structure contained in housing 12 of FIG. 2, not shown in FIG. 9. Ring 108 and cylinder 109, and all the structures thereabove, are hollow to accommodate the wires which are connected to the electronics such as wires 57, 58, 62, 63 and 66, shown in FIG. 2.

As shown in FIG. 7, assembly 100 includes an entirely conventional gate valve 110. Probe 102 can be retracted above the gate or lowered below it to the position shown in FIG. 7. It is thus free and open communication at least from pipeline 101 to a flange 111 on an upper housing 112. Gate valve 110 has a housing 113 including a neck portion 114 which may be substantially longer than as shown. Preferably, there is adequate space for all the structure shown in FIG. 9 below flange 111 when the probe 102 is retracted to permit the gate of valve 110 to be closed without touching probe 102 or any of the structure below flange 111 shown in FIG. 9.

As shown in FIG. 7, assembly 100 includes a fitting 115. A handwheel 116 is located above fitting 115.

The structure below flange 111 shown in FIG. 9 is carried by a hollow shaft 117, shown in FIG. 9, which extends upwardly through housing 112 and appears above handwheel 116 in FIG. 7. Shaft 117 has a thread 118 which extends along the length thereof a distance which is at least sufficient to place probe 102 in the position shown in FIG. 7 and to retract it above the gate of valve 110. A ring 119 is fixed to shaft 117 by a rod 120 which is threaded into ring 119 as indicated at 121 in FIG. 8. A fitting 122, shown in both FIGS. 7 and 8, has bosses 123 and 124. The upper end of shaft 117 is threaded into boss 124. Boss 123 has a female thread 125 into which conduit may be threaded. Thus, wires extending upwardly from probe 102 outwardly of the upper end of shaft 117, shown in FIG. 8, may extend further through the conduit threaded into boss 123. Fitting 122 is substantially cylindrical and hollow except for bosses 123 and 124. If desired, the fitting 122 may be providing with cover plates fixed thereto, as shown in FIG. 7.

Rod 120 performs two functions. In the first place, it indicates that the axis of cylinder 106, shown in FIG. 9, runs perpendicular thereto for orientation of probe 102 about the axis of shaft 117. In the second place, when probe 102 is being inserted into or retracted from pipeline 101, this may be done manually by holding onto rod 120 and turning handwheel 116.

Figure 8:
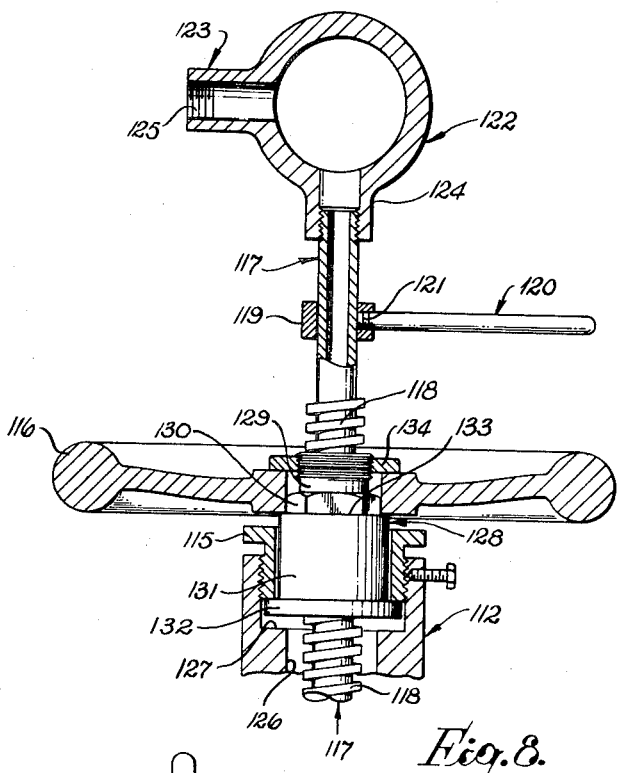
FIG. 8 is a vertical section view of a portion of the assembly shown in FIG. 8.

As shown in FIG. 8, upper housing 112 has a bore 126 therethrough through which shaft 117 passes. Both shaft 117 and thread 118 thereon are spaced from the internal surface of housing 112 at 126.

Housing 112 has a counter bore 127 into which fitting 115 is threaded. Another fitting 128 is located inside fitting 115. Fitting 128 includes a cylindrical projection 129, a flange 130 in the shape of a hex head nut or bolt, a body 131 and a flange 132. Projection 129, flange 130, body 131 and flange 132 are all integral parts of fitting 128. Fitting 128 is completely solid except for a hole therethrough which is threaded. Shaft 117 is threaded through fitting 128 by thread 118. Shaft 117 and thread 118 are thus freely rotatably inside fitting 128. However, rotation of handwheel 116 in one direction causes shaft 117 to rise as it is held in a non-rotatable position by rod 120. When handwheel 116 is turned in the opposite direction, and shaft 117 is prevented from rotating, shaft 117 will lower.

Handwheel 116 has a hex bore to slip easily over flange 130. Handwheel 116 is maintained in a fixed position on fitting 128 by its fairly snug engagement with flange 130, and an abutment with a shoulder 133 at the upper end of body 131. Further, a hex nut 134 holds handwheel 116 down tight against shoulder 133 by being threaded onto projection 129.

Shown in FIG. 9, upper housing flange 111 carries a rubber O-ring 135 which provides a fluid tight seal between flange 111 and shaft 117.

An extension 136 is heliarc welded to shaft 117 at 137.

A metal bellows 138 is sealed to extension 136 near the upper end of the extension at 139, and to a boss 140 on the upper end of cylinder 109 at 141. Except at point 139, bellows 138 is spaced from the external surface of extension 136. Extension 136 also has a boss 142 which extends into the interior of a bore 143 in the upper end of cylinder 109, but in spaced relation thereto.

The space between bellows 138 and extension 136, and the space between the internal surface of bore 133 and the external surface of extension boss 142 is filled with rubber at 144. The rubber 144 may be bonded to all surfaces surrounding it, if desired.

Even though O-ring 135 is shown in FIG. 9 as being carried by upper housing flange 111, it will be appreciated that O-ring 135 may, in fact, be mounted on shaft 117, if desired.

Although the invention may many times be used in the position shown in FIG. 7 where probe 102 is raised upwardly out of pipeline 101 and lowered vertically downward thereinto, it is to be understood that the invention requires no particular orientation. Thus, as used herein, the phrase "up and down" and any similar reference is hereby defined to include "back and forth" or otherwise.

This definition shall apply not only to this description but also to the claims. The same is true of the following definition of "densitometer."

The word "densitometer" by itself or used in any phrase herein is hereby to include all or any part of a device for producing an electrical output signal which is a function of the density of a fluid. The word "densitometer" or any phrase used therewith is, therefore, not to be limited to a density indicator. On the other hand, the word "densitometer" may or may not be an indicator. Thus, for example, it is often possible to use the invention in combination with a volume flowmeter to produce a signal directly proportional to mass flow rate, total mass flow or otherwise. Any of the output signals may be employed for control purposes without indication. On the other hand, they may be employed for indication purposes only. Still further, they may be employed both for control purposes and for indication purposes.

What is claimed is:

1. Densitometer apparatus comprising: a pipeline; extension means defining a port through the wall of said pipeline; an upper housing; a valve having a housing connected between said extension means and said upper housing; a longitudinal inner member having upper and lower portions, said member being mounted in said upper housing; a vibration densitometer probe having upper and lower portions; mounting means connecting the lower portion of said member to the upper portion of said probe, said probe being movable up and down with said member through said valve housing between a position above said valve and a position inside said pipeline; and a fluid tight seal between said inner member and said upper housing, said seal being located a distance from said valve such that said probe may be retracted to a position above said valve so that said valve may be closed without interference by said probe, said probe having a flexible structure mounted thereon in a position such that it can be moved into said pipeline, said structure being adapted to vibrate, said inner member lower portion being more rigid than said structure, said probe upper portion being more rigid than said structure, said mounting means including a flexible body connecting said inner member lower portion with said probe upper portion, said probe being freely supported and spaced from all structures therearound except the said inner member lower portion.

2. The invention as defined in claim 1, wherein said inner member lower portion is telescoped into said probe upper portion in spaced relation thereto, and an elastomer filling said space.

3. The invention as defined in claim 2, including a metal bellows sealed around and to the upper end of said probe upper portion and sealed around and to said inner member lower portion at a location spaced upwardly from the upper end of said probe upper portion.

4. The invention as defined in claim 3, wherein said bellows is spaced from said inner member lower portion between the bellows ends, said elastomer also filling the space between said bellows and the external surface of said inner member lower portion.

5. The invention as defined in claim 3, wherein said elastomer is a single piece of rubber bonded to all the surfaces surrounding it.

6. The invention as defined in claim 1, including a metal bellows sealed around and to the upper end of said probe upper portion and sealed around and to said inner member lower portion at a location spaced upwardly from the upper end of said probe upper portion.

7. The invention as defined in claim 6, wherein said bellows is spaced from said inner member lower portion between the bellows ends, and an elastomer filling the space between said bellows and the external surface of said inner member lower portion.

8. A vibration densitometer probe and a mounting therefor comprising: a support; and a flexible body freely suspending said probe from said support, said probe being spaced from all structures therearound except by its connection to said support via said flexible body, said support including a rigid lower portion, said probe having a rigid upper portion, said body being connected between said support lower portion and said probe upper portion, said support being an inner member, said inner member lower portion being telescoped into said probe upper portion in spaced relation thereto; and an elastomer filling said space.

9. The invention as defined in claim 8, including a metal bellows sealed around and to the upper end of said probe upper portion and sealed around and to said inner member lower portion at a location spaced upwardly from the upper end of said probe lower portion.

10. The invention as defined in claim 9, wherein said bellows is spaced from said inner member lower portion between the bellows ends, said elastomer also filling the space between said bellows and the external surface of said inner member lower portion.

11. The invention as defined in claim 10, wherein said elastomer is a single piece of rubber bonded to all the surfaces surrounding it.

12. A vibration densitometer probe and a mounting therefor comprising: a support; and a flexible body freely suspending said probe from said support, said probe being spaced from all structures therearound except by its connection to said support via said flexible body, said support including a rigid lower portion, said probe having a rigid upper portion, said body being connected between said support lower portion and said probe upper portion, said support being an inner member; a metal bellows sealed around and to the upper end of said probe upper portion and sealed around and to said inner member lower portion at a location spaced upwardly from the upper end of said probe upper portion.

13. The invention as defined in claim 12, wherein said bellows is spaced from said inner member lower portion between the bellows ends, and an elastomer filling the space between said bellows and the external surface of said inner member lower portion.

* * * * *